United States Patent [19]
Rosario

[11] Patent Number: 5,967,338
[45] Date of Patent: Oct. 19, 1999

[54] CHILD'S ENTERTAINMENT STORAGE STAND

[76] Inventor: Henry Rosario, 706 Blue Oak Dr., Lewisville, Tex. 75067

[21] Appl. No.: 09/060,291

[22] Filed: Apr. 14, 1998

Related U.S. Application Data

[60] Provisional application No. 60/047,317, May 21, 1997.

[51] Int. Cl.⁶ .................................................. A47G 29/00
[52] U.S. Cl. ........................................ 211/40; 211/41.12
[58] Field of Search .................................. 211/40, 41.12; D6/407, 629

[56] References Cited

U.S. PATENT DOCUMENTS

| | | | |
|---|---|---|---|
| D. 338,572 | 8/1993 | Mattikow | D6/407 |
| D. 338,573 | 8/1993 | Mattikow | D6/407 |
| D. 359,872 | 7/1995 | Dardashti | D6/629 |
| D. 360,099 | 7/1995 | Wu | D6/629 |
| D. 361,464 | 8/1995 | Dardashti | D6/629 |
| D. 370,377 | 6/1996 | Hsu | D6/629 |

*Primary Examiner*—Alvin Chin-Shue
*Assistant Examiner*—Sarah Purol
*Attorney, Agent, or Firm*—Richard C. Litman

[57] ABSTRACT

An entertainment storage stand for storing entertainment objects such as video cassette tapes, audio cassette tapes, compact discs, and other entertainment items that appeal to children, made up of a three dimensional character having a chest area in which a series of paired shelf supports are provided extending from opposing side walls at a fixed distance, having a width corresponding to a length or width of an object to be stored.

5 Claims, 4 Drawing Sheets

CHILD'S ENTERTAINMENT STORAGE STAND

CROSS-REFERENCE TO RELATED APPLICATION

This application claims the benefit of U.S. Provisional Patent Application Ser. No. 60/047,317, filed May 21, 1997.

BACKGROUND OF THE INVENTION

1. Field of the Invention

The present invention generally relates to an entertainment display or storage stand and, more specifically, to a display or storage stand that both appeals to children and holds relatively flat entertainment objects such as video cassette tapes, audio cassette tapes, compact discs, or the like.

2. Description of the Prior Art

The commercial success and widespread use of entertainment objects such as video cassette tapes, audio cassette tapes, compact discs, and other entertainment items has resulted in the need for display or storage arrangements for them. In the past, various display or storage arrangements have been used to store, display or otherwise hold such entertainment objects. However, little attention has been directed toward developing an entertainment display or storage arrangement that is recognizable and appeals to children.

The related art is represented by the following patents of interest.

U.S. Design Pat. No. 338,572 and U.S. Design Pat. No. 338,573, both issued to Nina Mattikow on Aug. 24, 1993, show entertainment storage arrangements configured, respectively, in the form of a rocking horse and a bus. Mattikow does not suggest configuring an entertainment storage arrangement in the form of a three dimensional character that appeals to children and does not suggest the use of shelf elements to hold entertainment objects.

U.S. Design Pat. No. 359,872 and U.S. Design Pat. No. 361,464, both issued to Shahriar Dardashti, respectively, on Jul. 4, 1995 and Aug. 22, 1995, show entertainment storage arrangements resembling a guitar and a saxophone. Shahriar does not suggest configuring an entertainment storage arrangement in the form of a three dimensional character that appeals to children.

U.S. Design Pat. No. 360,099 issued to Min-chou Wu on Jul. 11, 1995, shows an entertainment storage arrangement resembling a building. Wu does not suggest configuring an entertainment storage arrangement in the form of a three dimensional character that appeals to children.

U.S. Design Pat. No. 370,377 issued to Jessica Hsu on Jun. 4, 1996, shows an entertainment storage arrangement ornamented by a flat character known to children. Hsu does not suggest configuring the storage arrangement in the form of a three dimensional character that appeals to children.

There remains a need for an entertainment display or storage arrangement which is recognizable or appeals to children for holding entertainment objects such as video cassette tapes, audio cassette tapes, compact discs, and other entertainment items in an attractive yet orderly fashion.

None of the above inventions and patents, taken either singly or in combination, is seen to describe the instant invention as claimed.

SUMMARY OF THE INVENTION

The present invention is an entertainment storage stand. The storage stand is an elongated enclosure essentially formed as a unitary three dimensional character having an outer shell and a chest area including a back wall and an open front configured in the form of a case comprising a plurality of spaced apart shelf supports that extend inwardly from opposing side wall portions. The case is rectilinearly shaped and made of any durable and desirable materials, such as plastic, etc. The spaced apart shelf supports are configured to give structure to support a particular type of entertainment object, such as a video cassette tape, an audio cassette tape, a compact disc, or another entertainment item. The outer shell is configured in the form of a three dimensional character and made from materials which form a pliant outer shell suitable for safe handling by children. The material may be a foamed rubber, fabric shell with filling, or other suitable material commonly used in the manufacture of toys such as stuffed animals. This outer shell protects the case from rough handling customarily inflicted upon objects by children, and protects the child from the necessarily rectilinear shape and corners of the case.

The three dimensional character is preferably configured in the form of any character recognizable or known to children. The character could include any cartoon character appealable to children, such as a character commonly known as Barney, Mickey Mouse, Winnie the Pooh, Alladin, and any other cartoon characters created by Walt Disney, Inc., Warner Brothers, Looney-Toons, Power Rangers, etc.

The entertainment objects each have a length, a width and a thickness. Typically, a video cassette tape case is 4 1/16 inches wide by 7 3/8 inches long, an audio cassette tape case is 2 1/2 inches wide by 3 15/16 inches long, and a compact disc case is 4 7/8 inches wide by 5 9/16 inches long. The opposing side walls are spaced apart a distance that is approximately the same as the length or width of a selected entertainment object to be stored. The distance between adjacent shelf supports is approximately the same as the thickness of the selected entertainment object, and the depth of the back wall is approximately the same as the length or width of the selected entertainment object.

Accordingly, it is a principal object of the invention to provide an child's entertainment display or storage stand essentially consisting of a three dimensional character recognizable or appealable to children having a chest area in which a plurality of pairs of shelf elements extend from side walls spaced apart a distance approximately corresponding to the length or width of the entertainment object to be stored.

It is another object of the invention to provide an child's entertainment storage stand with a construction of durable material, such as plastic, which minimizes the expense of manufacture and provides secure and separate containment of entertainment objects.

It is a further object of the invention to provide a child's entertainment storage stand for entertainment objects such as video cassette tapes, audio cassette tapes, compact discs, and other entertainment items.

Still another object of the invention is to configure a child's entertainment storage stand in a unitary three dimensional form of a cartoon character.

Still another object of the invention is to provide a child's entertainment storage stand for entertainment objects which allows the user to observe the entertainment object titles and select which entertainment object he or she would like to remove from the storage stand.

It is an object of the invention to provide improved elements and arrangements thereof in a child's entertainment storage stand for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
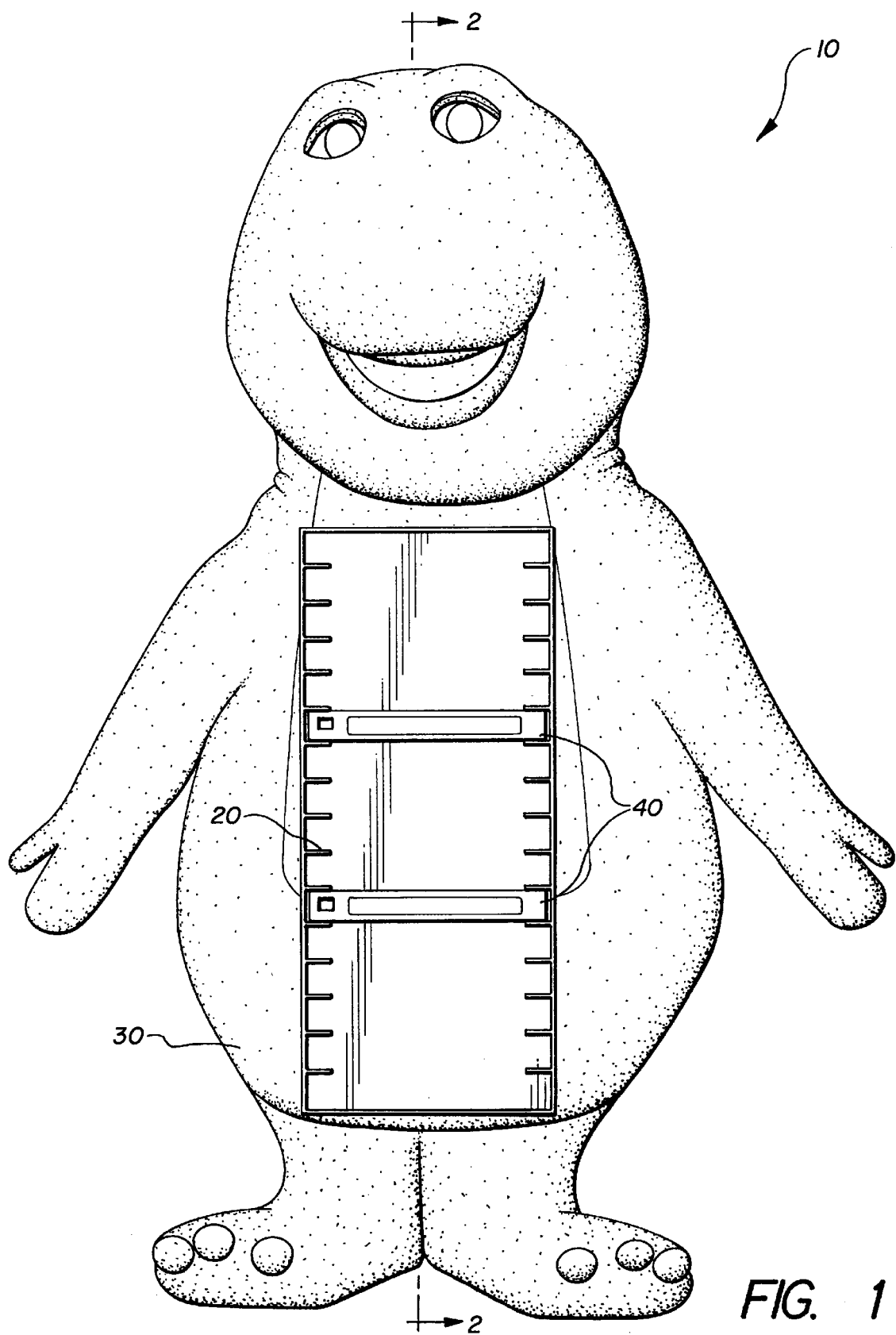
FIG. 1 is a front view of a first embodiment of the invention.
Figure 2:
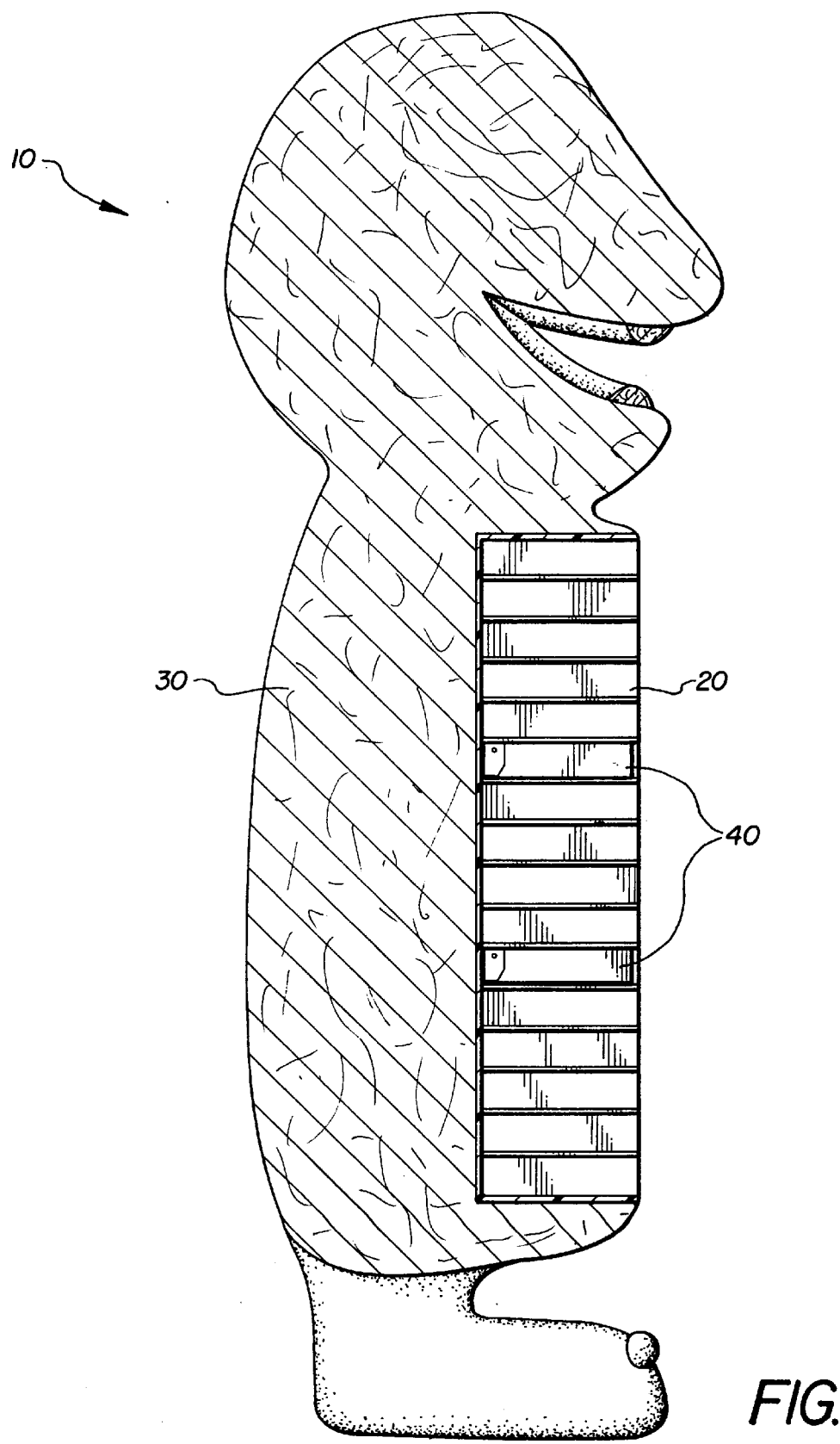
FIG. 2 is a side view along lines 2—2 of FIG. 1.

Turning now to the drawings, FIGS. 1 and 2 show one embodiment of an entertainment storage stand 10. The storage stand 10 is an elongated enclosure essentially formed as a unitary three dimensional character having an outer shell 30 and a chest area including a back wall and an open front configured in the form of a case comprising a plurality of spaced apart shelf supports 20 that extend inwardly from opposing side wall portions. The case is rectilinearly shaped and made of any durable and desirable materials, such as plastic, etc. The spaced apart shelf supports 20 are configured to give structure to support a particular type of entertainment object 40, such as a video cassette tape, an audio cassette tape, a compact disc, or another entertainment item. The outer shell 30 is configured in the form of a three dimensional character and made from materials which form a pliant outer shell 30 suitable for safe handling by children. The material may be a foamed rubber, fabric shell with filling, or other suitable material commonly used in the manufacture of toys such as stuffed animals. This outer shell protects the case from rough handling customarily inflicted upon objects by children, and protects the child from the necessarily rectilinear shape and corners of the case.

Figure 3:
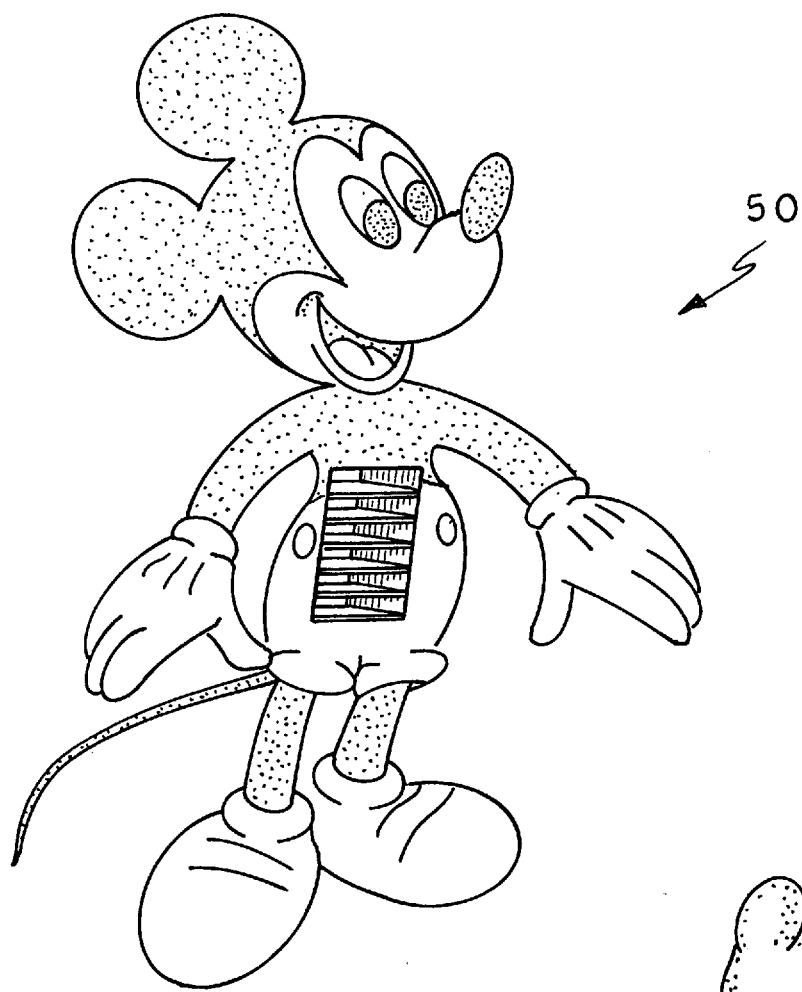
FIG. 3 is a front perspective view of a second embodiment of the invention.
Figure 4:
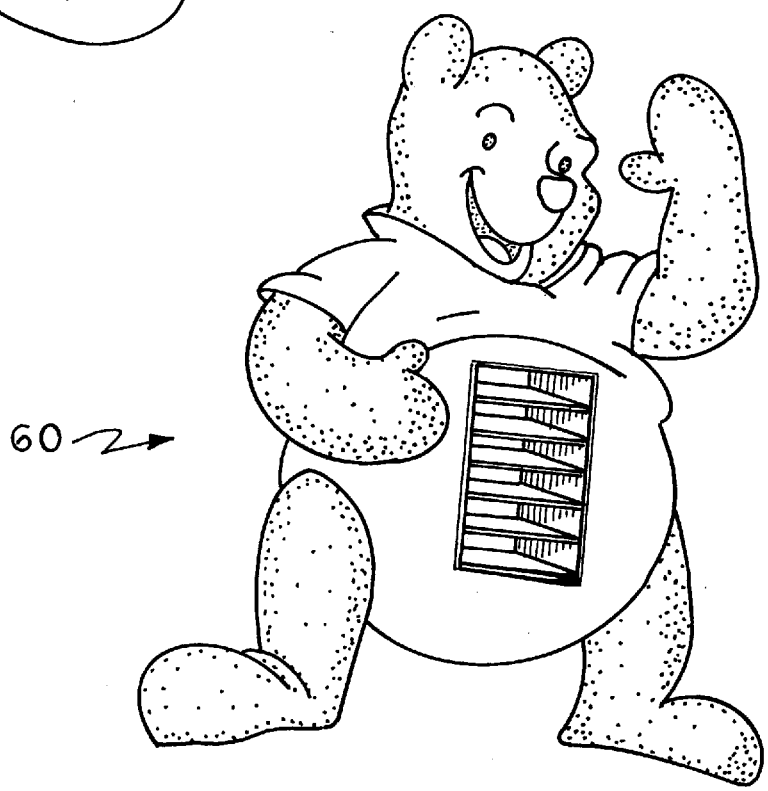
FIG. 4 is a front perspective view of a third embodiment of the invention.
Figure 5:
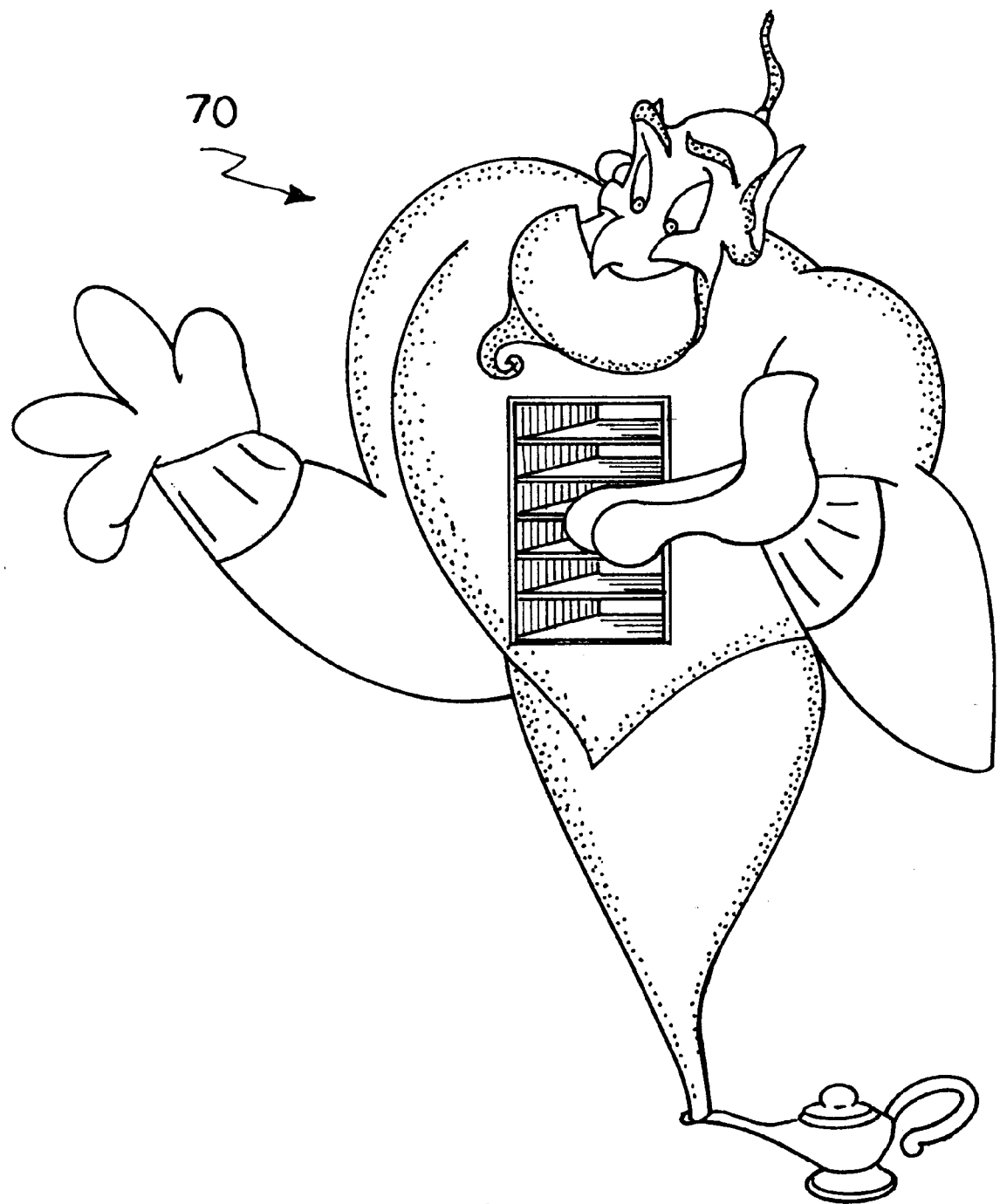
FIG. 5 is a front perspective view of a fourth embodiment of the invention.

The three dimensional character is preferably configured in the form of any character recognizable or known to children. The character shown in FIGS. 1 and 2 represents a character commonly known as Barney. However, the character could include any cartoon character appealable to children, such as Mickey Mouse, Winnie the Pooh, Alladin, and any other cartoon characters created by Walt Disney, Inc., Warner Brothers, Looney-Toons, Power Rangers, etc. FIGS. 3, 4, and 5 respectively show characters in the form of Mickey Mouse, Winnie the Pooh, and Alladin.

The entertainment objects 40 each have a length, width and thickness. Typically, a video cassette tape case is 4 1/16 inches wide by 7 3/8 inches long, an audio cassette tape case is 2 1/2 inches wide by 3 15/16 inches long, and a compact disc case is 4 7/8 inches wide by 5 9/16 inches long. The opposing side walls are spaced apart a distance that is approximately the same as the length or width of a selected entertainment object to be stored. The distance between adjacent shelf supports 20 is approximately the same as the thickness of the selected entertainment object 40, and the depth of the back wall is approximately the same as the length or width of the selected entertainment object 40.

It is to be understood that the present invention is not limited to the embodiments described above, but encompasses any and all embodiments within the scope of the following claims.

I claim:

1. An entertainment display or storage unit that appeals to children for selectively holding relatively flat entertainment objects each having a length, a width and a thickness comprising:

a three dimensional character having a pliant outer shell with a base and defining a cavity in an open chest area with opposing side walls configured in the form of a case, wherein said pliant outer shell comprises a foamed rubber fabric with filling;

a plurality of paired shelf supports extending inwardly from said opposing side walls, and spaced a distance approximately corresponding the length or width of an entertainment object to allow a said object to be supported by each paired shelf supports and held in a position in said unit generally perpendicular to a base of said unit.

2. The entertainment display or storage unit according to claim 1, wherein said case is integrally molded using a plastic material.

3. The entertainment display or storage unit according to claim 1, wherein the entertainment objects are video cassette tapes.

4. The entertainment display or storage unit according to claim 1, wherein the entertainment objects are audio cassette tapes.

5. The entertainment display or storage unit according to claim 1, wherein the entertainment objects are compact discs.

* * * * *